United States Patent [19]

Bartlett

[11] 4,255,748

[45] Mar. 10, 1981

[54] BUS FAULT DETECTOR

[75] Inventor: Peter G. Bartlett, Davenport, Iowa

[73] Assignee: Automation Systems, Inc., Eldridge, Iowa

[21] Appl. No.: 11,327

[22] Filed: Feb. 12, 1979

[51] Int. Cl.³ .................. G01R 31/00; G06F 11/00
[52] U.S. Cl. .................. 340/661; 340/651; 340/664; 371/28; 371/58
[58] Field of Search .............. 340/635, 650, 651, 653, 340/661, 664, 511, 146.1 AB, 146.1 R; 235/302.2; 307/350; 371/6, 14, 28, 57, 58, 65

[56] References Cited

U.S. PATENT DOCUMENTS

| | | | |
|---|---|---|---|
| 3,219,991 | 11/1965 | Freitas | 340/661 X |
| 3,577,123 | 5/1971 | Taylor et al. | 340/146.1 AB |
| 3,610,842 | 10/1971 | Formenti et al. | 340/146.1 AB X |
| 3,665,303 | 5/1972 | Richards et al. | 340/653 X |
| 3,867,618 | 2/1975 | Oliver et al. | 235/302.2 |
| 4,082,218 | 4/1978 | Paulinksi | 235/302.2 |

*Primary Examiner*—Donald J. Yusko
*Assistant Examiner*—Joseph E. Nowicki
*Attorney, Agent, or Firm*—Woodard, Weikart, Emhardt & Naughton

[57] ABSTRACT

The present invention comprises computer system equipment useful for detection of faults in data transmission within a computer system. Fault detection is accomplished by monitoring the current flow through a digital signal source means, which is characterized in that it only draws significant current during a non-transition period when a fault condition occurs.

22 Claims, 2 Drawing Figures

BUS FAULT DETECTOR

BACKGROUND OF THE INVENTION

1. Field of the Invention

The field of the invention is fault detection circuits for computer systems. More specifically the field of the invention is those systems which detect errors in the transmission of digital data within computer systems such as programmable controllers.

2. Brief Description of the Prior Art

Fault detection is a desirable feature for most computing systems. Undetected errors lead to incorrect or unintelligible results. In programmable controller computing systems, the transmission of incorrect data to the output circuits causes wrong functions to be performed, potentially resulting in damage to equipment controlled by the programmable controller.

Most larger computer systems therefore use a system to check for errors in the transmission of data within the system. Virtually all large computers use a parity check system to detect faults. In such systems one (or more) "parity" bits of a multi-bit data group (byte) contain information with respect to the contents of the other bits within the group. For example, one bit may indicate whether the sum of the other bits is odd or even. After the digital signal has been transmitted the sum of the other bits is recalculated and compared with the parity bit received. Proper oddness or evenness of the sum in comparison with the parity bit is indicative of a correct transmission.

The need for detecting data transmission errors in small computers and microprocessors (including programmable controllers) is also important. However, parity check systems are relatively much more burdensome to programmable controllers which often use single bit data transmission. Some programmable controllers are known which use four or eight bit signals. The use of a parity bit system in small computing circuits tends to increase expense, reduce the capacity of the circuits, and slow down the operation of the circuits. Therefore, some small computers, microprocessors and many programmable controller systems do not use any fault detection system. Other systems do use some form of fault detection at the sacrifice of the simplicity and efficiency of the system. U.S. Pat. No. 4,118,792 to Struger discloses an example of one such programmable controller which uses a complex system for the detection of errors in data transmission.

SUMMARY OF THE INVENTION

The present invention relates to digital equipment which includes a circuit useful for detecting faults. The circuit is a simple and inexpensive alternative to either a parity check system or other prior art fault detection system. The circuit detects faults by sensing current flowing in the power supply leads of a digital signal source means. The circuit includes detector means which is responsive to the current flow to sense abnormally high currents during non-transition periods which indicate that (1) a data signal is at an indefinite logic state, or (2) the bus driven by the digital signal source means is responding to an undesired transient or has an improper load indicative of a short. For a precise understanding of the nature and scope of the invention, reference should be made to the claims.

DETAILED DESCRIPTION OF THE PREFERRED EMBODIMENT

In the preferred embodiment of the present invention, a digital signal source means including a bus signal source 11 and a bus driver 10, supplies digital information through a bus of eight bus lines 13A through H, to a digital signal load including resistive loads 18A through H in bus controlled circuits 13. Resistive loads 18 B through G are not shown in FIG. 1, however they are connected in the same manner as resistive loads 18A and 18H. Transmission of the digital information involves periodic transitions in the digital data and is initiated by bus signal source 11 through input leads 12A through H. Clock 15 is synchronized with and controls the periodic transitions of the digital signals. The bus controlled circuits 13 operate in response to the digital information received, and are also controlled through control and address lines 14.

Figure 1:
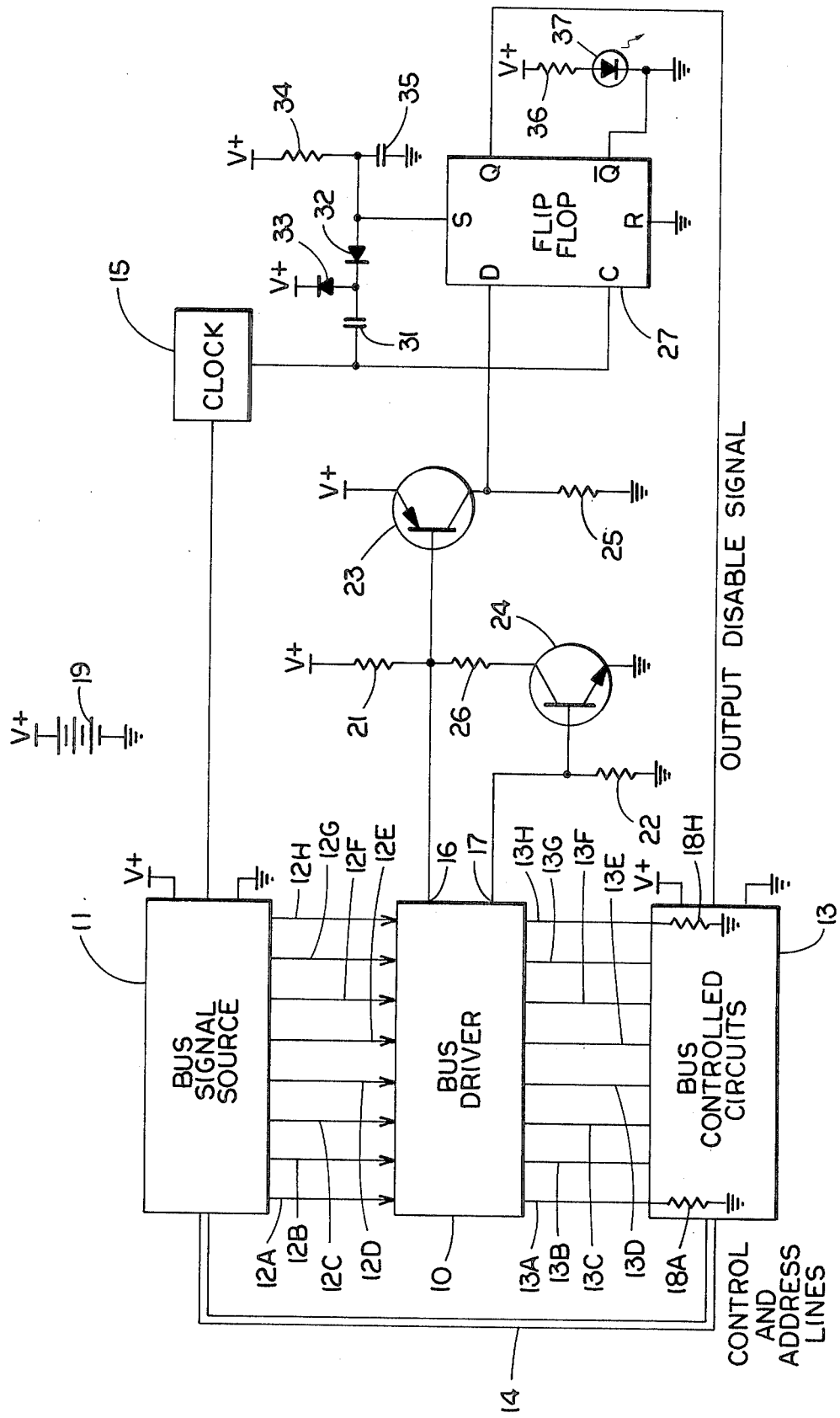
FIG. 1 is a schematic diagram of the preferred embodiment of the present invention.
Figure 2:
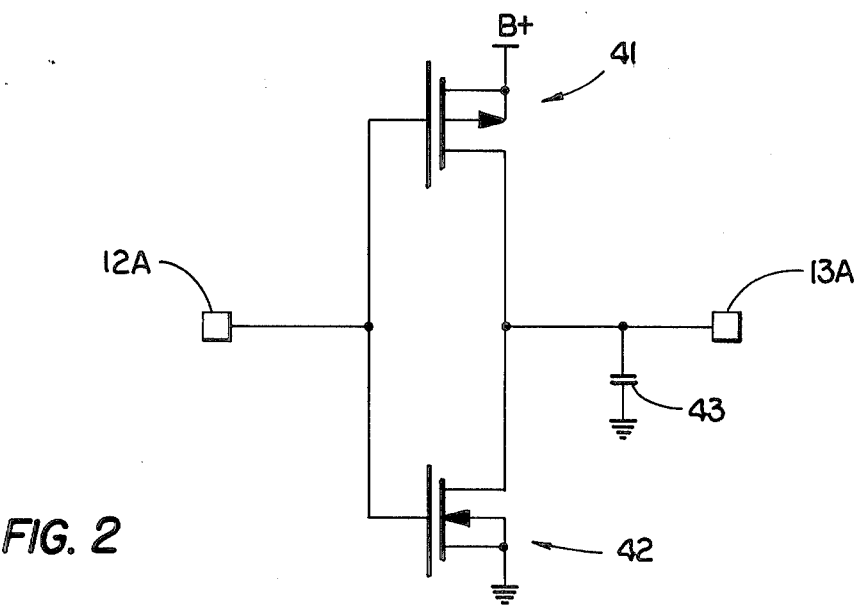
FIG. 2 is a simplified equivalent circuit of a portion of the internal circuitry of the bus driver of FIG. 1 and illustrates a basic CMOS (complementary metal oxide semiconductor field effect transistor) amplifying stage.

FIG. 2 illustrates a simplified equivalent circuit of a portion of the internal circuitry of the bus driver of FIG. 1 and illustrates a basic CMOS (complementary metal oxide semiconductor field effect transistor) amplifying stage. It is preferred that the internal circuitry be MOS or more preferrably CMOS. In the preferred embodiment, the bus driver 10 is part number CD40115D by RCA, and includes CMOS circuitry.

Input lead 12A, one of eight inputs leads to bus driver 10, transmits either a logic high or a logic low signal to the gates of P-channel transistor 41 and N-channel transistor 42. The drain of P-channel transistor 41 is connected to the voltage supply lead B+ 16 of the bus driver 10. The source of N-channel transistor 42 is connected to the ground lead 17 of bus driver 10. The source of P-channel transistor 41 and the drain of N-channel transistor 42 are both connected to output lead 13A and have an effective capacitive load 43 to ground. For purposes of illustration and explanation, transistors 41 and 42 are illustrated in an equivalent simplified form. It is to be understood, however, that the actual integrated circuit used with the preferred embodiment is much more complex, although operating on the same principle.

When the input lead 12A is at a logic high, N-channel transistor 42 is on, maintaining output 13A at a logic low. When input lead 12A is at a logic low, P-channel transistor 41 is on, maintaining output 13A at a logic high.

MOS and CMOS type integrated circuits have the characteristic such that they normally draw insignificant current in the steady state condition. Therefore, significant current is only drawn by bus driver 10 when (1) bus driver 10 is in transition between logic states, (2) a bus line is responding to an undesired transient or has an improper load indicative of a short, or (3) an input does not make a complete transition and is therefore at an indefinite logic state. In these cases, either the P-channel transistor 41 or the N-channel transistor 42 or both transistors continue to remain conductive and to draw significant current compared to the current which is drawn in the normal steady state condition. Thus, in a non-transition state, bus driver 10 is characterized by having more current flow when a fault condition occurs than when no fault condition occurs.

In the preferred embodiment bus driver 10 receives the digital signal to be transmitted from bus signal source 11 through input leads 12A through H. Bus driver 10 transmits the digital signal to bus controlled circuits 13 through bus lines 13A through H. Bus driver 10 receives its direct current voltage supply at voltage supply leads 16 and 17. Voltage supply terminal V+ applies 12 direct current volts to voltage supply lead 16 through resistor 21. The ground terminal of the voltage supply 19 is connected to voltage supply lead 17 through resistor 22.

Transistors 23 and 24 form the basis of the detector circuitry. Transistors 23 and 24 are biased as follows. The base of transistor 23 is connected to the voltage supply lead 16. Transistor 23 is a PNP junction type transistor. The emitter of transistor 23 is connected directly to voltage supply terminal V+ and the collector of transistor 23 is connected to ground through resistor 25. The base of transistor 24 is connected to the voltage supply lead 17. Transistor 24 is an NPN junction type transistor. The emitter of transistor 24 is connected directly to ground and the collector of transistor 24 is connected to the base of transistor 23 through resistor 26.

In the preferred embodiment, resistors 21, 22, 25 and 26 and transistors 23 and 24 are selected such that when less than 10 milliamps of current is flowing though voltage supply lead 16 or voltage supply lead 17 the transistors 23 and 24 are in an off state. If more than 10 milliamps of current flows through voltage supply lead 16 then the voltage applied to the base of transistor 23 will decrease to more than 0.7 volt less than V+ (12 volts), therefore transistor 23 will turn on producing a logic high at the collector of transistor 23. If more than 10 milliamps of current flows through voltage supply lead 17 then the voltage applied to the base of transistor 24 will increase to more than 0.7 volt above electrical ground and thus transistor 24 will turn on. When transistor 24 turns on current is drawn from voltage supply terminal V+ through resistors 21 and 26 decreasing the voltage applied to the base of transistor 23 to more than 0.7 volt less than V+ (12 volts), turning on transistor 23 and thus also resulting in a logic high output at the collector of transistor 23. In the preferred embodiment, the reference voltages at which the transistors 23 and 24 change state are 11.3 and 0.7 volts respectively. These reference voltages reflect the 0.7 volt voltage differential across the emitter base silicon junctions of transistors 23 and 24.

A reference current level of 10 milliamps was chosen in the preferred embodiment because it is sufficiently greater than the normal non-transition current flow of 3 to 4 milliamps through voltage supply leads 16 and 17 to eliminate the chance of false triggering.

Bus driver 10 connected as disclosed in the preferred embodiment will produce a current flow in its voltage supply lead of just above 10 milliamps when a resistance of 1,000 ohms is placed as a load from an output to either B+ or ground, depending upon the state of the output. It is very desirable in making a fault detector that the response be at least sufficient to trigger the fault detection circuit when a resistance of 100 ohms is placed as a load on an output.

The preferred embodiment of the fault detector will detect intermediate level data signals on lines 12A through H as faults. Intermediate level data signals are produced by programmable read only memories (PROMS) which are used in the bus signal source 11. These intermediate level signals tend to be the result of aging or faulty programming.

The data terminal D of flip flop 27 is connected directly to the collector of transistor 23. The clock terminal C of flip flop 27 is connected to clock 15. Flip flop 27 is selected to have the characteristic such that if a logic high is applied to the data terminal D of flip flop 27 when positive going transition is applied to the clock terminal C of flip flop 27, then an output disable signal is given through terminal Q.

The clock 15 is used as the control for flip flop 27 because it is a simple means of detecting whether the bus driver should be in a transistion or a non-transition (steady state) condition. As has been previously stated, clock 15 synchronizes the fault detection to the periodic transitions of the digital signals. Therefore, when clock 15 has a triggering transition (pulse) going high, bus driver 10 should be in a non-transition state. The clock and the associated fault sensor are synchronized so that the transitions of data from the digital signal source do not occur when the flip flop 27 is triggered to sample for a fault. The fault sensor senses just before each potential transition of data. The fault sensor circuit operates at the same time as data on the bus is acquired by the bus controlled circuits 13.

The output disable signal disables outputs associated with the bus controlled circuits 13. This may be done by directly disabling the bus controlled circuits 13. At the same time non-fault terminal $\bar{Q}$ produces a logic low output drawing a current through the series combination of resistor 36 and light emitting diode 37, indicating the fault condition.

Circuit components 31 through 35 comprise a clock sensor circuit which senses the clock pulses of clock 15 and are connected as follows. Capacitor 31 connects clock 15 with diodes 32 and 33. The cathode of diode 32 is connected to capacitor 31 and the anode of diode 32 connects with the set terminal S of flip flop 27. The anode of diode 33 connects with capacitor 31 and the cathode of diode 33 connects to voltage supply terminal V+. Voltage supply terminal V+ also connects to the set terminal S of flip flop 27 through resistor 34; and connects to ground through the series combination of resistor 34 and capacitor 35.

In the event that clock 15 ceases to produce pulses, capacitor 35 charges, producing a logic high output at the set terminal S of flip flop 27, triggering an output disable signal through terminal Q. Reset terminal R of flip flop 27 is disabled by its connection to ground.

Although the preferred embodiment of the present invention has been illustrated in the context of a bus driving circuit, it should be noted that the present invention is easily adaptible to any portion of a computing system that is transmitting digital signals, such as the transmission of addresses through address lines. Also, the present invention is not limited to fault detection in one digital signal transmitter, as the detector circuitry could be adapted to connect with a number of various digital signal transmitters within a computing system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. Digital equipment which includes a circuit useful for detecting faults comprising:
    (a) digital signal source means for supplying digital information, said signal source having two voltage supply leads;
    (b) voltage supply means for supplying direct current to said digital signal source means, said voltage supply means having two terminals which connect with the two voltage supply leads of said signal source means;
    (c) said digital signal source means being characterized by having more current flow through one of its voltage supply leads in a non-transition state when a fault condition occurs than when no fault condition occurs;
    (d) digital signal load means for receiving digital information from said digital signal source means, said load means having its inputs supplied with power by said voltage supply source through said signal source;
    (e) a bus connecting said signal source means to said signal load means; and
    (f) detector means, responsive to the current flow between said voltage supply means and said signal source means and for indicating a fault if the current flow is greater than a reference level, said detector means having sufficient sensitivity to respond to an increase in current in an amount which would result from a load of 100 ohms placed on an output.

2. The equipment of claim 1 in which said digital signal source means includes means for producing digital signals which have periodic transitions and in which the equipment of claim 1 additionally comprises:
    (g) clock means synchronized with the periodic transitions of digital signals from said digital signal source means; and
    (h) means for synchronizing said detector means to said clock means to prevent said detector means from responding to the current flow during transitions of digital signals.

3. The equipment of claim 1 in which the digital signal source means includes a CMOS integrated circuit.

4. The equipment of claim 1 in which the digital information is a multi-bit binary signal.

5. The equipment of claim 2 in which said detector means additionally includes means for sensing the periodic operation of said clock means and for indicating a fault when said clock means fails to maintain a periodic operation.

6. The equipment of claim 1 in which said detector means additionally includes:
    (a) a first resistor, and
    (b) a second resistor; and in which a first one of the terminals of said voltage supply means is connected to a first one of the voltage supply leads of said digital signal source means through said first resistor and in which a second one of the terminals of said voltage supply means is connected to a second one of the voltage supply leads of said digital signal source means through said second resistor.

7. The equipment of claim 6 in which said detector means additionally includes:
    (c) a first transistor, the base of which is connected to the first voltage supply lead,
    (d) a second transistor, the base of which is connected to the second voltage supply lead,
    (e) first transistor biasing means for biasing said first transistor such that said first transistor will change state if the voltage applied to the base of said first transistor decreases to less than a first reference voltage,
    (f) second transistor biasing means for biasing said second transistor such that said second transistor will change state if the voltage applied to the base of said second transistor increases to greater than a second reference voltage.

8. The equipment of claim 7 in which the first reference voltage is approximately the voltage of the first terminal of said voltage supply means and the second reference voltage is approximately the voltage of the second terminal of said voltage supply means.

9. The equipment of claim 8 in which the voltage of the first terminal of said voltage supply means is approximately 12 direct current volts and the second terminal of said voltage supply means is electrical ground.

10. The equipment of claim 7 in which the first reference voltage is approximately 12 volts and the second reference voltage is approximately electrical ground.

11. The equipment of claim 7 in which said first transistor is a PNP junction type transistor and said second transistor is an NPN junction type transistor.

12. The equipment of claim 11 in which said detector means additionally includes a third and a fourth resistor, and in which
    A. said first transistor biasing means includes the first terminal of said voltage supply means being connected to the emitter of said first transistor and the second terminal of said voltage supply means being connected to the collector of said first transistor through said third resistor, and
    B. said second transistor biasing means includes the second terminal of said voltage supply means being connected to the emitter of said second transistor and the first terminal of said voltage supply means being connected to the collector of said second transistor through said fourth resistor.

13. The equipment of claim 11 in which said detector means additionally includes a third and a fourth resistor, and in which
    A. said first transistor biasing means includes the first terminal of said voltage supply means being connected to the emitter of said first transistor and the second terminal of said voltage supply means being connected to the collector of said first transistor through said third resistor, and
    B. said second transistor biasing means includes the second terminal of said voltage supply means being connected to the emitter of said second transistor and the base of said first transistor being connected to the collector of said second transistor through said fourth resistor.

14. The equipment of claim 5 in which said means for synchronizing said detector means to said clock means includes an electronic flip flop.

15. The equipment of claim 13 additionally comprising:

(g) clock means synchronized with the periodic transitions of digital signals from said digital signal source means; and (h) an electronic flip flop having a clock terminal which is connected to said clock means and having a data terminal which is connected to the collector of said first transistor.

16. The equipment of claim 15 in which said detector means additionally includes clock sensor means which is connected to said clock means and in which said flip flop additionally has a set terminal which is connected to said clock sensor means; said clock sensor means being for triggering the set terminal of said flip flop if said clock means fails to maintain a periodic operation.

17. Digital equipment which includes a circuit useful for detecting faults comprising:
(a) digital signal source means for supplying digital information containing digital signals which have periodic transitions, said signal source having two voltage supply leads;
(b) voltage supply means for supplying direct current to said digital signal source means, said voltage supply means having two terminals which connect with the two voltage supply leads of said signal source means;
(c) said digital signal source means being characterized by having more current flow through one of its voltage supply leads in a non-transition state when a fault condition occurs than when no fault condition occurs;
(d) digital signal load means for receiving digital information from said digital signal source means, said load means having its input supplied with power by said voltage supply source through said signal source;
(e) a bus connecting said signal source means to said signal load means;
(f) detector means, responsive to the current flow between said voltage supply means and said signal source means and for indicating a fault if the current flow is greater than a reference level;
(g) clock means synchronized with the periodic transitions of digital signals from said digital signal source means; and
(h) means for synchronizing said detector means to said clock means to prevent said detector means from responding to the current flow during transitions of digital signals.

18. The equipment of claim 17 in which said detector means additionally includes means for sensing the periodic operation of said clock means and for indicating a fault when said clock means fails to maintain a periodic operation.

19. The equipment of claim 18 in which said means for synchronizing said detector means to said clock means includes an electronic flip flop.

20. The equipment of claim 19 in which said detector means additionally includes clock sensor means which is connected to said clock means and in which said flip flop additionally has a set terminal which is connected to said clock sensor means; said clock sensor means being a means for triggering the set terminal of said flip flop if the clock fails to maintain a periodic operation.

21. Digital equipment which includes a circuit useful for detecting faults comprising:
(a) digital signal source means for supplying digital information, said signal source having two voltage supply leads;
(b) voltage supply means for supplying direct current to said digital signal source means, said voltage supply means having two terminals which connect with the two voltage supply leads of said signal source means;
(c) said digital signal source means being characterized by having more current flow through one of its voltage supply leads in a non-transition state when a fault condition occurs than when no fault condition occurs;
(d) digital signal load means for receiving digital information from said digital signal source means, said load means having its input supplied with power by said voltage supply source through said signal source;
(e) a bus connecting said signal source means to said signal load means;
(f) detector means, responsive to the current flow through the voltage supply leads of said digital signal source means for indicating a fault if the current flow through either voltage supply leads is greater than a reference level.

22. Digital equipment which includes a circuit useful for detecting faults comprising:
(a) digital signal source means for supplying digital information, said signal source having two voltage supply leads;
(b) voltage supply means for supplying direct current to said digital signal source means, said voltage supply means having two terminals which connect with the two voltage supply leads of said signal source means;
(c) said digital signal source means being characterized by having more current flow through one of its voltage supply leads in a non-transition state when a fault condition occurs than when no fault condition occurs;
(d) digital signal load means for receiving digital information from said digital signal source means, said load means having its input supplied with power by said voltage supply source through said signal source;
(e) a bus connecting said signal source means to said signal load means;
(f) detector means, responsive to the current flow between said voltage supply means and said signal source means and for indicating a fault if the current flow is greater than a reference level; and
(g) output disable means, responsive to said detector means, for disabling digital signal load means when a fault is indicated by said detector means, said output disable means allowing the continued operation of said digital signal source means when a fault is indicated by said detector means.

* * * * *